(12) United States Patent
Vayanos et al.

(10) Patent No.: US 7,599,336 B2
(45) Date of Patent: *Oct. 6, 2009

(54) METHOD AND APPARATUS FOR TIME-SHARING CHANNELIZATION CODE IN A CDMA COMMUNICATION SYSTEM

(75) Inventors: Alkinoos H. Vayanos, San Diego, CA (US); Francesco Grilli, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 841 days.

This patent is subject to a terminal disclaimer.

(21) Appl. No.: 10/929,120

(22) Filed: Aug. 27, 2004

(65) Prior Publication Data

US 2005/0025096 A1 Feb. 3, 2005

Related U.S. Application Data

(63) Continuation of application No. 09/901,921, filed on Jul. 9, 2001, now Pat. No. 6,785,250.

(51) Int. Cl.
*H04B 7/216* (2006.01)
(52) U.S. Cl. ........................ 370/335; 370/342
(58) Field of Classification Search ................ None
See application file for complete search history.

(56) References Cited

U.S. PATENT DOCUMENTS

| 6,195,341 | B1 | 2/2001 | Sakoda et al. |
| 6,208,632 | B1 | 3/2001 | Kowalski et al. |
| 6,498,933 | B1 | 12/2002 | Park et al. |

(Continued)

FOREIGN PATENT DOCUMENTS

DE 197 13 667 C1 10/1998

(Continued)

OTHER PUBLICATIONS

Ericsson, TSGR1#7(99)b27, "Use of Multiple Schrambling Codes in Compressed Mode," TSG-RAN Working Group 1 meeting #7, Hannover Germany, pp. 1-6, Aug. 30-Sep. 3, 1999.

(Continued)

*Primary Examiner*—Jayanti K Patel
*Assistant Examiner*—Anthony Sol
(74) *Attorney, Agent, or Firm*—Kenneth K. Vu; Larry J. Moskowitz

(57) ABSTRACT

Techniques to time-share a common channelization code among multiple terminals for compressed mode transmissions. Each terminal is initially assigned a respective channelization code used to channelize data transmitted in non-compressed frames for the terminal. A common channelization code used to channelize data transmitted in compressed frames for the terminals is also selected. Each compressed frame includes one or more compressed transmissions and all or a portion of a transmission gap. The compressed frames for the terminals are scheduled such that the compressed transmissions for the compressed frames do not overlap. Thereafter, non-compressed frames for each terminal are channelized with the channelization code assigned to the terminal, and compressed frames for the terminals are channelized with the common channelization code. The compressed frames may be scheduled to be (1) non-overlapping at their frame boundaries, (2) non-overlaping with respect to the compressed transmissions, and/or (3) interlaced.

49 Claims, 10 Drawing Sheets

U.S. PATENT DOCUMENTS 6,785,250 B2    8/2004    Vayanos et al.

FOREIGN PATENT DOCUMENTS

| JP | 2001-45536 | 2/2001 |
|---|---|---|
| KR | 20010016706 | 3/2001 |
| WO | 94/29981 | 12/1994 |
| WO | 99049609 | 9/1999 |
| WO | 00038349 | 7/2000 |
| WO | 01/22636 A1 | 3/2001 |
| WO | 01/41467 A2 | 6/2001 |

OTHER PUBLICATIONS

Hyundai electronics & Shinsegi Telecomm., TSGR1-d05/99 "A Modified CMCCH(Compressed Mode Common Channel)" TSG-RAN Working Group 1, meeting #7, Hannover, Germany, 2 pgs. (Aug. 30-Sep. 3, 1999).

Hyundai electronics & Shinsegi Telecomm., TSGR1-b10/99, "A Scheme for Downlink Compressed Mode Using Common Channel, CMCCH" TSG-RAN Working Group 1 meeting #7, Hannover Germany, Aug. 30-Sep. 3, 1999.

Hyundai electronics & Shinsegi Telecomm., TSGR1-842/99, "New Scheme for Downlink Compressed Mode Using Common Channel" TSG-RAN Working Group 1 meeting #6, Espoo, Finland, Jul. 13-16.

TSGR1-d05199 "A Modified Cmcch (Compressed Mode Common Channel)" TSG-RAN Working Group 1 meeting #7, Hannover, Germany Aug. 30.-Sep. 3, 1999.

3GPP TS 25.212, "Compressed Mode", Ver, 4.0, Sec. 4.4, p. 52, (Dec. 2000).

3GPP TS 25.213, Channelization Codes, Ver, 3.2.0, Sec. 5.2.1, pp. 19-20, (Mar. 2000).

3GPP TS 4.213, "Scrambling code", Ver. 3.2.0, Sec. 5.2.2, pp. 20-21, (Mar. 2000).

3GPP TS 24.215, "Measurements for UTRA FDD, UE Measurements" Ver. 3.6.0, Sec. 6.1, pp. 13-15. (Mar. 2001).

International Search Report, PCT/US02/21782, International Search Authority European Office, Oct. 17, 2002.

International Preliminary Examination Report PCT/US02/021782. International Search Authority US, Apr. 18, 2003.

International Preliminary Examination Report, PCT/US2002/021782 - International Preliminary Examining Authority - US, Apr. 18, 2003.

METHOD AND APPARATUS FOR TIME-SHARING CHANNELIZATION CODE IN A CDMA COMMUNICATION SYSTEM

CLAIM OF PRIORITY UNDER 35 U.S.C. §120

The present Application for Patent is a Continuation and claims priority to patent application Ser. No. 09/901,921, entitled "Method and Apparatus for Time-Sharing Channelization Code in a CDMA Communication System," filed Jul. 9, 2001, now U.S. Pat. No. 6,785,250, and assigned to the assignee hereof and hereby expressly incorporated by reference herein.

BACKGROUND

1. Field

The present invention relates generally to data communication, and more specifically to techniques for time-sharing a common channelization code among a number of terminals in compressed mode to more efficiently utilize the available channelization codes.

2. Background

Wireless communication systems are widely deployed to provide various types of communication including voice and packet data services. These systems may be based on code division multiple access (CDMA), time division multiple access (TDMA), or some other multiple access technique. CDMA systems may provide certain advantages over other types of system, including increased system capacity. A CDMA system is typically designed to conform to one or more standards, such as IS-95, cdma2000, and W-CDMA standards, all of which are known in the art and incorporated herein by reference.

The W-CDMA standard supports a "compressed mode" of operation on the downlink whereby data is transmitted from a base station to a terminal within a shortened time duration (i.e., compressed in time). The compressed mode is used in W-CDMA to allow a terminal in active communication with the system (i.e., on a traffic channel) to temporarily leave the system in order to perform measurements on a different frequency and/or a different Radio Access Technology (RAT) without losing data from the system. In the compressed mode, data is transmitted to the terminal during only a portion of a (10 msec) frame so that the remaining portion of the frame (referred to as a transmission gap) may be used by the terminal to perform the measurements.

In accordance with the W-CDMA standard, the reduction in the transmission time for a given compressed frame can be achieved by either (1) reducing the amount of data to transmit to the terminal in the frame, (2) increasing the coding rate, or (3) increasing the data rate. Each of these available mechanisms for transmitting a compressed frame is associated with tradeoffs that may impact performance, as described below.

First, reducing the amount of data to transmit in a compressed frame may be achieved via scheduling at a higher signaling layer, but the reduced amount of data may be undesirable for some applications. For example, for voice users, the reduction in the amount of data may cause a corresponding reduction in the rate of an adaptive multi-rate (AMR) vocoder down to a level (e.g., 5.15 kbps) that may result in significantly reduced quality of service.

Second, increasing the coding rate may be achieved by "puncturing" or deleting some of the coded bits (this mechanism is only available on the downlink). However, as the transmission gap increases (to up to 7 slots out of 15 possible slots in a frame), more coded bits need to be punctured, the coding rate increases, and higher transmit power is needed for the unpunctured bits to achieve the desired level of performance (i.e., a particular bit error rate or frame error rate) at the terminal. To perform inter-frequency/inter-RAT measurements, long transmission gaps (e.g., almost half a frame) will likely be required. However, puncturing is impractical for these longer transmission gaps because of the excessively high transmit power requirement.

And third, increasing the data rate may be achieved by channelizing the data to be transmitted with a shorter-length channelization code. The W-CDMA standard utilizes orthogonal variable spreading factor (OVSF) codes of various lengths to channelize the data prior to transmission to the terminals. The length or spreading factor (SF) of the OVSF codes can range from 4 to 512 chips, with shorter-length codes being capable of supporting correspondingly higher data rates. In accordance with the W-CDMA standard, a compressed frame for a particular terminal may be channelized with a channelization code of half the length (i.e., SF/2) as that of the channelization code used for non-compressed frames for the terminal. Moreover, the W-CDMA standard defines a specific relationship between the channelization code of length SF used for non-compressed frames and the channelization code of length SF/2 used for compressed frames.

The use of the specifically defined channelization code of length SF/2 for compressed frames reduces the number of channelization codes available for other uses by the system. In general, fewer codes are available for use as the spreading factor decreases, e.g., half as many channelization codes are available if the spreading factor is reduced by a factor of two. Conventionally, a channelization code of length SF/2 is assigned to each terminal operating in compressed mode and for the duration in which the terminal is in this mode. Each terminal in compressed mode would then effectively take up two channelization codes of length SF since one channelization code of length SF/2 occupies the "code space" of two channelization codes of length SF. Since W-CDMA may be code-limited on the downlink, assignment of a channelization code of length SF/2 to each terminal for the transmission of compressed frames is undesirable.

There is therefore a need in the art for techniques to more efficiently utilize channelization codes, especially in the compressed mode defined by the W-CDMA standard.

SUMMARY

Aspects of the invention provide techniques to time-share a common channelization code among multiple terminals for compressed mode transmissions. In many instances, the compressed data transmissions for a given terminal make up only a small fraction of the total time the terminal is in compressed mode, in which case allocation of a shorter-length channelization code to the terminal for the entire duration of the compressed mode operation would result in inefficient utilization of the channelization code. Techniques are thus provided herein to time-share a common channelization code for the compressed mode transmissions for multiple terminals.

In an aspect, a specific channelization code with a particular spreading factor is reserved by a base station and used for compressed mode transmissions for multiple terminals in communication with the base station. This common channelization code may be communicated to the terminals operating in compressed mode, along with values for a set of parameters that define the timing of their compressed mode transmissions. Thereafter, whenever the base station transmits data in a compressed frame to a given terminal, the common channelization code is used instead of the channelization code assigned to the terminal for normal mode.

A specific embodiment of the invention provides a method for transmitting data to a number of terminals in a wireless (e.g., W-CDMA) communication system. In accordance with the method, each terminal is initially assigned a respective channelization code used to channelize data transmitted in non-compressed frames for the terminal. A particular common channelization code used to channelize data transmitted in compressed frames for the terminals is also selected. Each compressed frame includes one or more compressed transmissions and all or a portion of a transmission gap, and the data for each compressed frame is transmitted in the compressed transmission(s). The compressed frames for the terminals are then scheduled such that the compressed transmissions for the compressed frames do not overlap. Thereafter, non-compressed frames for each terminal are channelized with the channelization code assigned to the terminal, and compressed frames for the terminals are channelized with the common channelization code.

Various schemes may be used to schedule the compressed frames. For example, the compressed frames may be scheduled such that (1) they are non-overlapping at their frame boundaries, (2) the compressed frames overlap but the compressed transmissions do not, and/or (3) the compressed frames are interlaced. The common channelization code typically has a length that is half of the length of the shortest channelization code assigned to the terminals. For each terminal in compressed mode, the scheduling and the corresponding transmission gap pattern sequence parameters are typically determined once, and the parameter values are provided to the terminal where they are used to derive the timing and configuration of the compressed mode transmission.

The invention further provides other methods and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
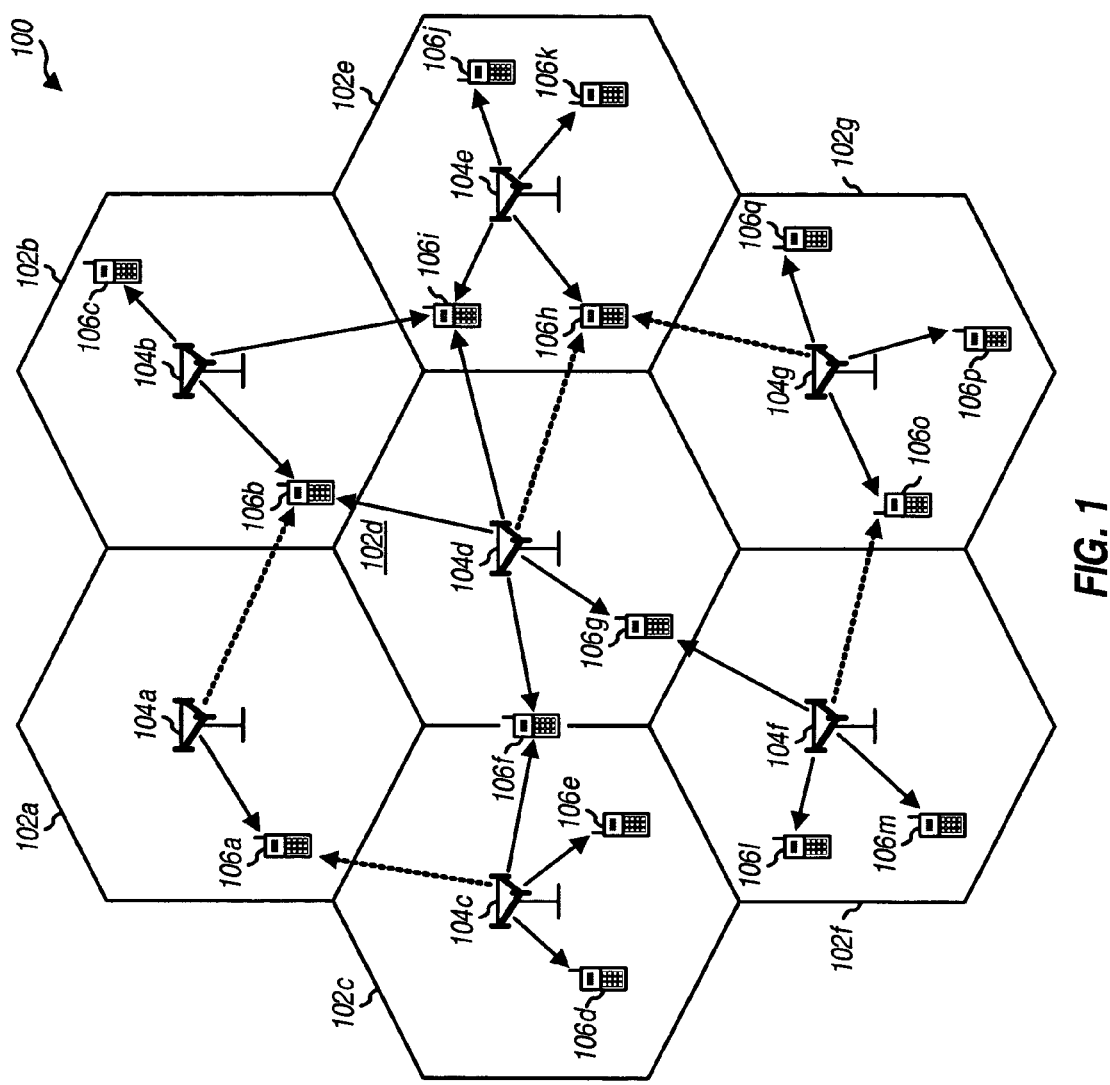
FIG. 1 is a diagram of a wireless communication system that supports a number of users and is capable of implementing various aspects and embodiments of the invention.

FIG. 1 is a diagram of a wireless communication system 100 that supports a number of users and is capable of implementing various aspects and embodiments of the invention. System 100 includes a number of base stations 104 that provide coverage for a number of geographic regions 102. The base station is also commonly referred to as a base transceiver system (BTS), and the base station and/or its coverage area are often referred to as a cell. System 100 may be designed to implement any combination of one or more CDMA standards such as IS-95, cdma2000, W-CDMA, and other standards.

As shown in FIG. 1, various terminals 106 are dispersed throughout the system. In an embodiment, each terminal 106 may communicate with one or more base stations 104 on the downlink and uplink at any given moment, depending on whether or not the terminal is active and whether or not it is in soft handover. The downlink (i.e., forward link) refers to transmission from the base station to the terminal, and the uplink (i.e., reverse link) refers to transmission from the terminal to the base station.

As shown in FIG. 1, base station 104a transmits to terminal 106a on the downlink, base station 104b transmits to terminals 106b, 106c, and 106i, base station 104c transmits to terminals 106d, 106e, and 106f, and so on. In FIG. 1, a solid line with an arrow indicates a user-specific data transmission from the base station to the terminal. A broken line with an arrow indicates that the terminal is receiving pilot and other signaling, but no user-specific data transmission, from the base station. The uplink communication is not shown in FIG. 1 for simplicity.

Figure 2:
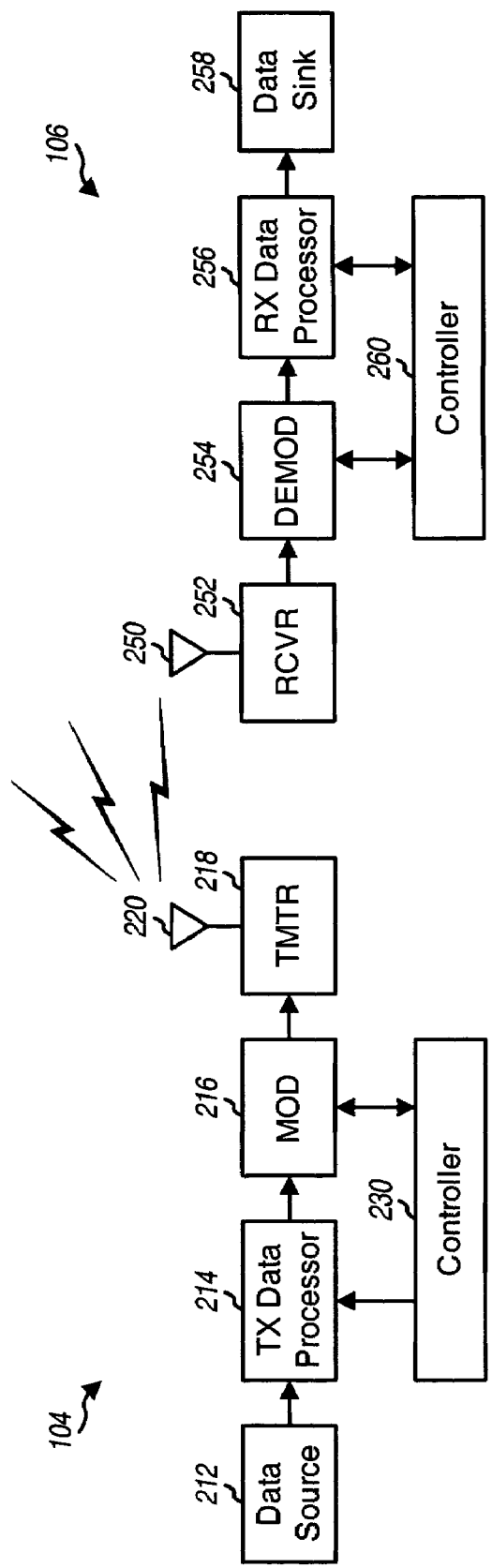
FIG. 2 is a simplified block diagram of an embodiment of a base station and a terminal.

FIG. 2 is a simplified block diagram of an embodiment of base station 104 and terminal 106, which are capable of implementing various aspects and embodiments of the invention. On the downlink, at base station 104, a transmit (TX) data processor 214 receives different types of traffic (e.g., user-specific data from a data source 212 and messages from a controller 230). TX data processor 214 then formats and codes the data and messages based on one or more coding schemes to provide coded data. Each coding scheme may include any combination of cyclic redundancy check (CRC), convolutional, Turbo, block, and other coding, or no coding at all. Typically, different types of traffic are coded using different coding schemes.

The coded data is then provided to a modulator (MOD) 216 and further processed to generate modulated data. For W-CDMA, the processing by modulator 216 includes (1) covering the coded data with channelization codes to channelize the user-specific data and messages onto their respective (dedicated and control) physical channels and (2) scrambling the channelized data with scrambling codes, which is equivalent to spreading of the channelized data with short pseudo-noise (PN) sequences in IS-95. The modulated data is then provided to a transmitter unit (TMTR) 218 and conditioned (e.g., converted to one or more analog signals, amplified, filtered, and quadrature modulated) to generate a downlink modulated signal suitable for transmission via an antenna 220 over a wireless link to the terminals.

At terminal 106, the downlink modulated signal is received by an antenna 250 and provided to a receiver unit (RCVR) 252. Receiver unit 252 conditions (e.g., filters, amplifies, downconverts, and digitizes) the received signal and provides samples. A demodulator (DEMOD) 254 then receives and processes the samples to provide recovered symbols. For W-CDMA, the processing by demodulator 254 includes (1) descrambling the samples with the same scrambling code used for the physical channel being recovered (i.e., which is equivalent to despreading the samples with the short PN sequences), (2) decovering the descrambled samples to channelize the received data and messages onto their respective dedicated and common channels, and (3) coherently demodulating the channelized data with a pilot recovered from the received signal.

Demodulator 254 may implement a rake receiver that can process multiple instances of the received signal and combine symbols from various multipaths for the physical channel being recovered to provide the recovered symbols. A transmitted signal may be received via multiple signal paths, and each received signal instance (or multipath) of sufficient strength may be assigned to and processed by a respective finger processor of the rake receiver. Each finger processor processes (e.g., despreads, decovers, and pilot demodulates) the assigned multipath to provide demodulated symbols for that multipath. The demodulated symbols from all assigned finger processors for a particular physical channel are then combined to provide the recovered symbols for that channel.

A receive (RX) data processor 256 then receives and decodes the recovered symbols to recover the user-specific data and messages transmitted on the downlink. The recovered messages may be provided to a controller 260 and used to control the processing of a subsequent data transmission. The processing by demodulator 254 and RX data processor 256 is complementary to that performed by modulator 216 and TX data processor 214 at base station 104, respectively.

Figure 3:
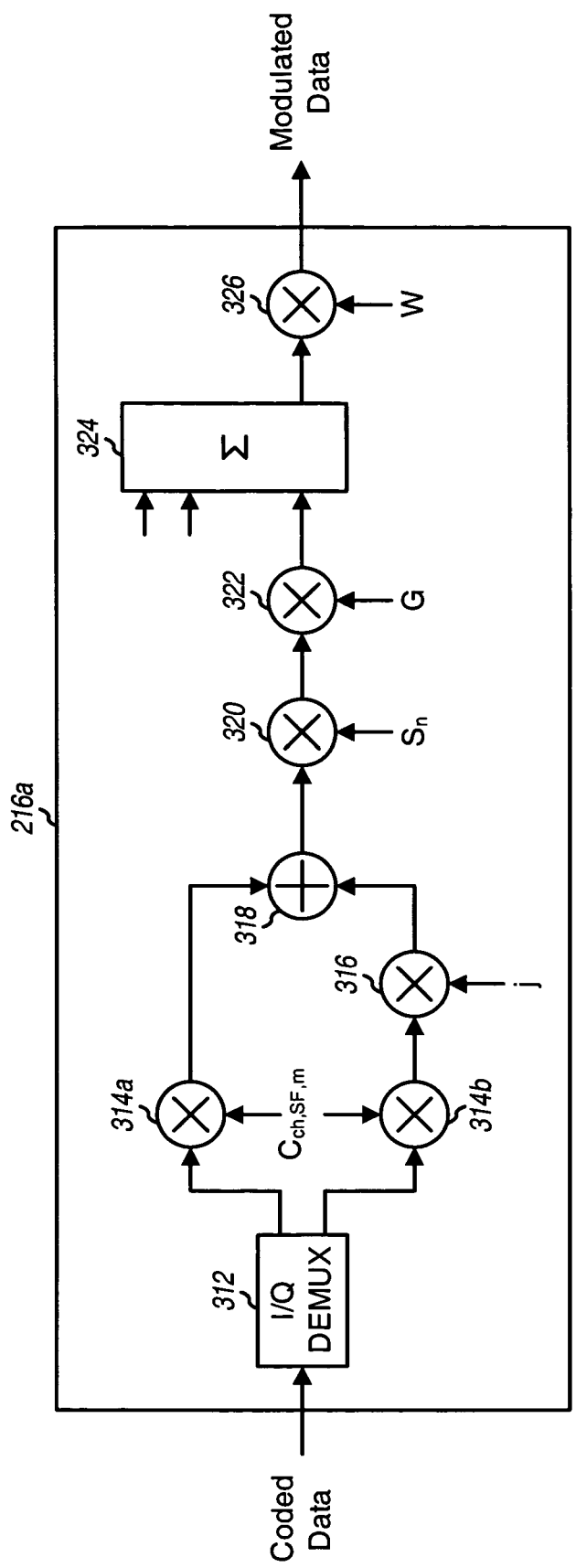
FIG. 3 is a block diagram of a modulator within the base station.

FIG. 3 is a block diagram of a modulator 216a, which is an embodiment of modulator 216 in FIG. 2. The coded data for a particular physical channel (i.e., the coded channel data) is provided to an I/Q demultiplexer (DEMUX) 312 that demultiplexes the data into inphase (I) and quadrature (Q) data components. The I and Q data components are then provided to multipliers 314a and 314b, respectively, and covered (i.e., multiplied) with a channelization code, $C_{ch,SF,m}$, assigned to the physical channel used to transmit the data.

The covered Q data component from multiplier 314b is provided to a multiplier 316 and multiplied with the complex symbol, j, to generate the imaginary part of the channelized data. The real part from multiplier 314a and the imaginary part from multiplier 316 are combined by an adder 318 to provide complex channelized data. The channelized data is then scrambled with a complex scrambling code, $S_n$, by a multiplier 320 and further scaled with a weight, G, by a multiplier 322. The weight, G, is selected for the physical channel being processed and is used to adjust the transmit power of the physical channel.

For the downlink, data for multiple terminals may be transmitted concurrently. The scrambled and weighted data from multiplier 322, the scrambled and weighted data for other physical channels (which may be intended for other terminals), and other data for some other physical channels (e.g., a common control physical channel) are then combined by an adder 324 to generate composite data. The composite data for each antenna used for data transmission is further multiplied with a complex weight, W, by a multiplier 326 to provided the modulated data. The weight, W, is used for phase adjustment in closed loop mode 1 and for phase/amplitude adjustment in closed loop mode 2, which are modes of a space time block coding transmit antenna diversity (STTD) mode defined by the W-CDMA standard.

In CDMA systems, data to be transmitted on the downlink is channelized so that the data on multiple physical channels (e.g., intended for multiple terminals) can be transmitted and received without interfering with each other. Each physical channel is assigned a particular channelization code selected from a set of possible channelization codes. The codes in the set are typically designed to be orthogonal with each other so that a particular code multiplied with itself and integrated over the length of the code will result in a high (energy) value, but if multiplied with other codes in the set and integrated over the code length will result in a zero value. Non-orthogonal channelization codes may also be used for channelizing but are not specified by the CDMA standards.

To perform channelization, the coded data to be transmitted is covered (or multiplied) with a channelization code assigned to the physical channel used to transmit the data. At the receiver, the transmitted data is recovered by decovering (or multiplying) the received samples with the same channelization code and integrating over the length of the code. Only data bits that have been channelized at the transmitter with the same code used for decovering at the receiver will result in high values, and data bits from other physical channels that had been channelized with other codes will integrate to low values (e.g., close to zero).

Figure 4:
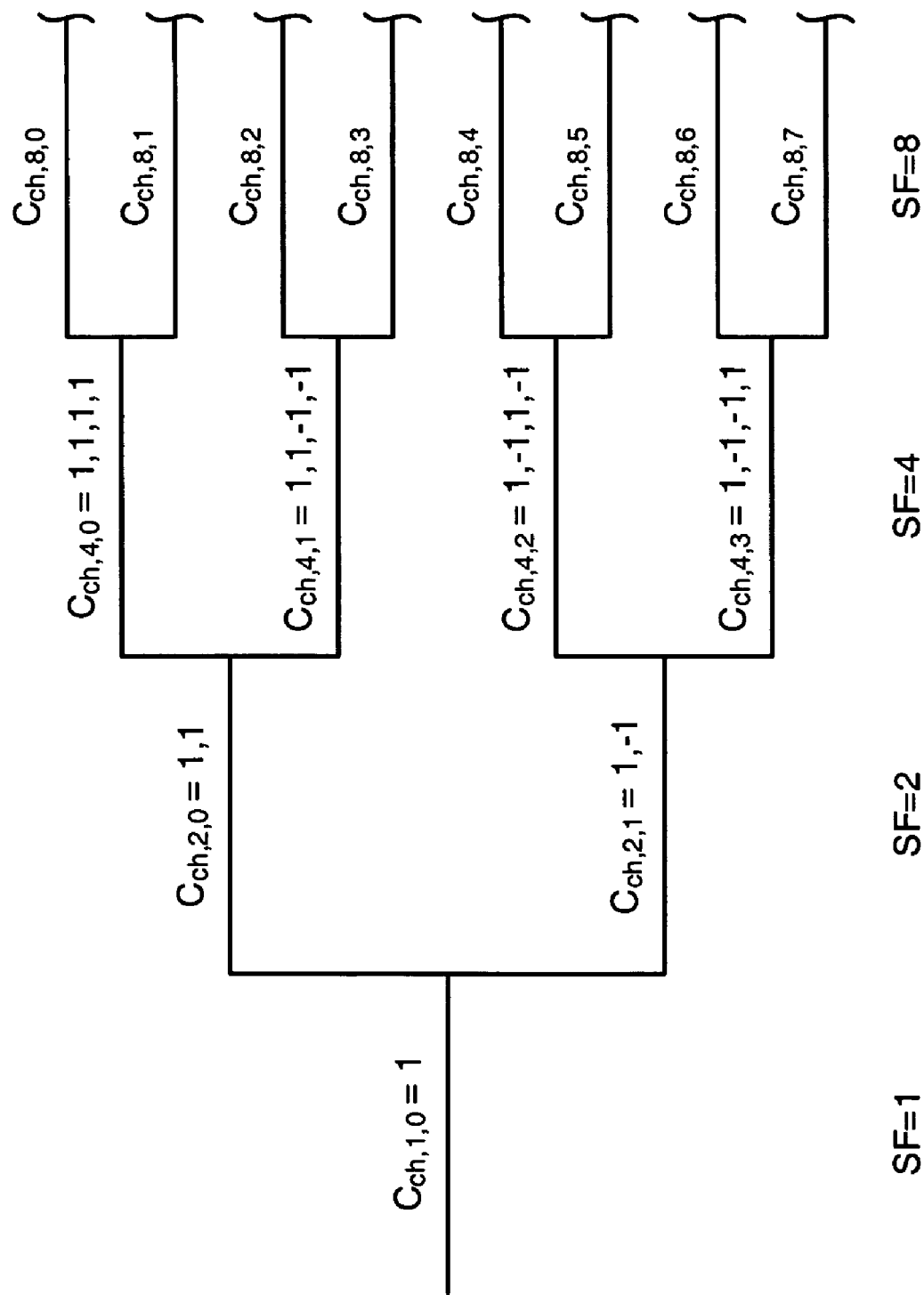
FIG. 4 is a diagram illustrating the structure of the OVSF codes defined by the W-CDMA standard and used as the channelization codes.

FIG. 4 is a diagram illustrating the structure of the orthogonal variable spreading factor (OVSF) codes defined by the W-CDMA standard and used as the channelization codes. Each OVSF code is specifically identified by a designation, $C_{ch,SF,m}$, where SF is the spreading factor (which is equal to the length of the code) and m is the identity of the particular code (i.e., m=0, 1, 2, . . . SF-1) for that spreading factor SF. The OVSF codes are "structured" codes, and successively longer OVSF codes can be generated from shorter OVSF codes in accordance with a set of rules. To generate OVSF codes of twice the length, each immediately shorter-length OVSF code is used to generate two new OVSF codes of the longer length. The first new OVSF code is generated by repeating the shorter-length OVSF code twice (i.e., $C_{ch,2SF,2m}=C_{ch,SF,m}, C_{ch,SF,m}$), and the second new OVSF code is generated by repeating the shorter-length OVSF code twice and inverting the second repetition (i.e., $C_{ch,2SF,2m+1}=C_{ch,SF,m},-C_{ch,SF,m}$). Based on this code generation scheme, the OVSF codes have spreading factors (or code lengths) that are factors of two.

As shown in FIG. 4, only one OVSF code is defined for a code length of one (i.e., $C_{ch,1,0}=1$). Two OVSF codes are defined for a code length of two (i.e., $C_{ch,2,0}=1,1$ and $C_{ch,2,1}=1,-1$), and are generated from the OVSF code of length 1 (i.e., $C_{ch,1,0}$). Similarly, four OVSF codes are defined for a code length of four (SF=4), with the OVSF codes ($C_{ch,4,0}=1,1,1,1$) and ($C_{ch,4,1}=1,1,-1,-1$) being generated from the OVSF code ($C_{ch,2,0}=1,1$) and the OVSF codes ($C_{ch,4,2}=1,-1,1,-1$) and ($C_{ch,4,3}=1,-1,-1,1$) being generated from the OVSF code ($C_{ch,2,1}=1,-1$). W-CDMA supports the use of OVSF codes having lengths that range from 4 to 512 chips.

The OVSF codes are identical to the Walsh codes used for IS-95, except that the index identifying the OVSF code (SF, m) is bit-reversed from the index used for the Walsh code (SF,m'). For example, for a code of length 64, the Walsh code (64,5) (5=b000101) is equivalent to the OVSF code (64,40) (40=b101000).

Figure 5:
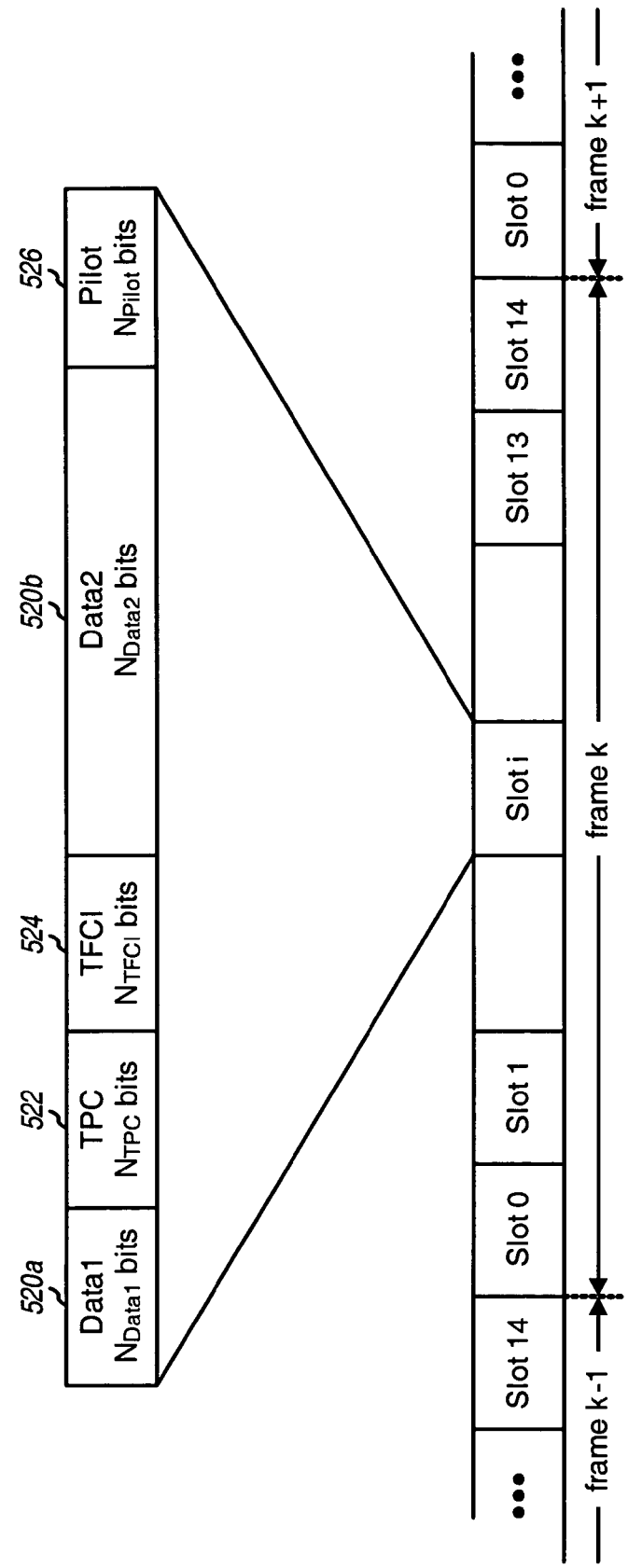
FIG. 5 is a diagram of a frame format and a slot format for a downlink dedicated physical channel (DPCH) defined by the W-CDMA standard.

FIG. 5 is a diagram of a frame format and a slot format for a downlink dedicated physical channel (DPCH) defined by the W-CDMA standard, which can be used to transmit user-specific data to a terminal. The data to be transmitted on the DPCH is partitioned into radio frames, with each radio frame including 15 slots labeled as slot 0 through slot 14. Each slot is further partitioned into a number of fields used to carry traffic data, signaling, and pilot data, or a combination thereof.

As shown in FIG. 5, for the DPCH, each slot includes first and second data fields (Data1 and Data2) 520a and 520b, a transmit power control (TPC) field 522, a transport format combination indicator (TFCI) field 524, and a pilot field 526. Data fields 520a and 520b are used to send user-specific data. Transmit power control field 522 is used to send power control information to direct the terminal to adjust its uplink transmit power either up or down to achieve the desired performance while minimizing interference to other terminals. Transport format combination indicator field 524 is used to send information indicative of the format (e.g., the bit rate, channelization code, and so on) of a shared physical channel associated with the DPCH. And pilot field 526 is used to send pilot data for the DPCH.

As noted above, the W-CDMA standard supports a compressed mode whereby user-specific data is transmitted to a terminal for a shortened period of time. As part of a scheme to more efficiently distribute system resources, the system (i.e., the UMTS Radio Access Network (UTRAN) in W-CDMA terminology) can command the terminal (i.e., the User Equipment (UE) in W-CDMA terminology) to monitor base stations on other frequencies and/or other radio access technologies (RATs) that can be supported by the terminal. Such other RATs may include time-division duplex (TDD/UMTS), Global System for Mobile Communications (GSM), and possibly other systems. To allow the terminal to perform the required measurements and as necessary based on the terminal's capabilities, the system can command the terminal to operate in compressed mode.

Figure 6:
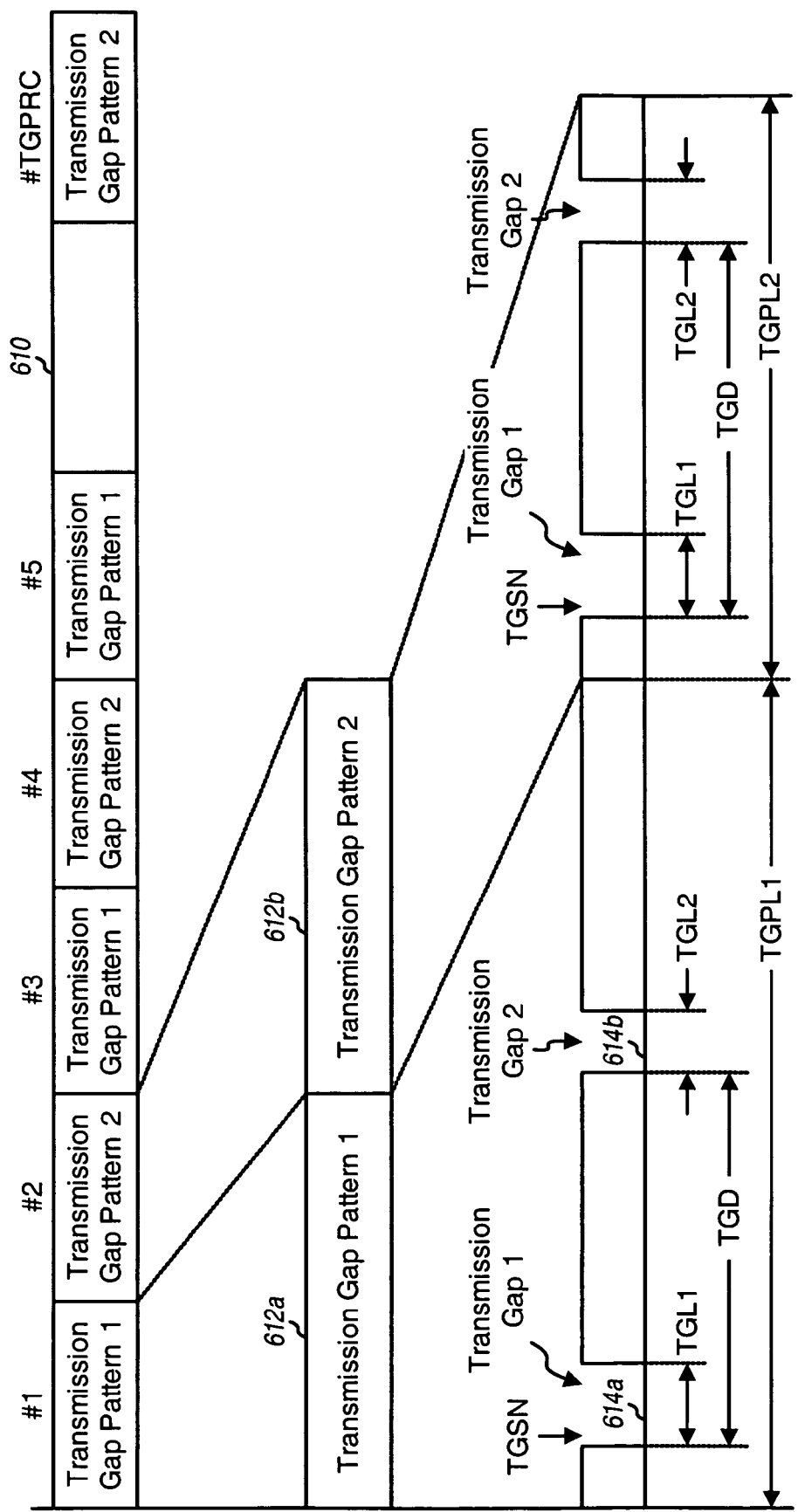
FIG. 6 is a diagram illustrating a compressed mode transmission in accordance with the W-CDMA standard.

FIG. 6 is a diagram illustrating a compressed mode transmission in accordance with the W-CDMA standard. In the compressed mode, user-specific data for a terminal is transmitted in accordance with a transmission gap pattern sequence 610, which is made up of alternating transmission gap patterns 1 and 2, respectively 612a and 612b. Each transmission gap pattern 612 further comprises a series of one or more compressed frames followed by zero or more non-compressed frames. Each compressed frame includes one or more compressed transmissions and all or a portion of a transmission gap. The data for each compressed frame is transmitted in the compressed transmissions (s), and the data for each non-compressed frame is transmitted over an entire (10 msec) frame.

A compressed frame series for each transmission gap pattern includes compressed data transmission interrupted by one or two transmission gaps 614. The parameters for transmission gap pattern sequence 610 are as follows:

TGSN (transmission gap starting slot number)—the slot number of the first transmission gap slot within the first radio frame of the transmission gap pattern (slot 1 to 14).

TGL1 (transmission gap length 1)—the duration of the first transmission gap within the transmission gap pattern (1 to 14 slots). The slots for the transmission gap must be distributed over two frames if TGL1>8 since at most 7 transmission gap slots can be included in a single frame.

TGL2 (transmission gap length 2)—the duration of the second transmission gap within the transmission gap pattern (1 to 14 slots). The same restriction as for TGL1 applies.

TGD (transmission gap distance)—the duration between the starting slots of two consecutive transmission gaps within a transmission gap pattern (15 to 269 slots, or 1 to almost 18 frames).

TGPL1 (transmission gap pattern length 1)—the duration of transmission gap pattern 1 (1 to 144 frames).

TGPL2 (transmission gap pattern length 2)—the duration of transmission gap pattern 2 (1 to 144 frames).

The compressed mode is further described in Documents Nos. 3GPP TS 25.212 (section 4.4), 25.213 (sections 5.2.1 an 5.2.2), and 25.215 (section 6.1), which are available from the 3GPP organization and incorporated herein by reference.

In the compressed mode, the data for a compressed frame may be scrambled with either the same (ordinary) scrambling code used for the non-compressed frames or an alternative (secondary) scrambling code. Furthermore, a channelization code with a lower spreading factor (or more specifically, half of the length of the channelization code used during normal operation) may be used for the compressed transmissions. The W-CDMA standard defines a specific relationship between the channelization code used for the compressed frames and the channelization code used for non-compressed frames, which can be expressed as:

$C_{ch,SF,m}$—the channelization code used for non-compressed frames, $C_{ch,SF/2,\lfloor m/2 \rfloor}$—the channelization code used for compressed frames if the ordinary scrambling code is used, and $C_{ch,SF/2,m \bmod SF/2}$—the channelization code used for compressed frames if the alternative scrambling code is used.

In accordance with the W-CDMA standard, on the downlink, the same set of ordinary and alternative scrambling codes is used for the data transmissions to all terminals. For terminals in compressed mode, the alternative scrambling code may be used to scramble data prior to transmission. If the alternative scrambling code is relied upon to achieve isolation between terminals in compressed mode and normal mode, then the channelization codes used for the terminals in compressed mode do not need to be orthogonal to the channelization codes used for other terminals that use the ordinary scrambling code. However, the use of two scrambling codes to achieve isolation may not be a viable solution for downlink transmissions because the two scrambling codes are not orthogonal and the amount of achievable isolation is limited. On the downlink, the transmissions to different terminals are typically transmitted at different power levels depending on the path loss to the terminals. Thus, a high-power transmission scrambled by the (non-orthogonal) ordinary scrambling code may result in high cross-channel interference to a low-power transmission scrambled by the alternative scrambling code, which may degrade performance. In fact, to achieve the optimal amount of isolation, the same scrambling code but different channelization codes should be used for the compressed and non-compressed frames.

As shown above, the channelization code used for the compressed frames is half the length of the channelization code used for the non-compressed frames. Moreover, the channelization code used for the compressed frames is specifically defined by the W-CDMA standard, and depends on whether the ordinary or secondary scrambling code is used for the compressed frames. Thus, it is necessary for the channelization code with the lower spreading factor (i.e., $C_{ch,SF/2,x}$) to be reserved for each terminal operating in compressed mode. This results in a doubling of the downlink code-space utilization.

In one common operating scenario, voice users currently require a channelization code with SF=128 on the downlink to support voice data at 12.2 kbps. If a factor-of-2 reduction in the available channelization codes is assumed due to soft handover, then 64 channelization codes would be available. When compressed mode using SF/2 is employed by the system and if each user is effectively assigned twice the number of channelization codes in order to use compressed mode, then 32 users per sector may be supported with orthogonal channelization codes in the worst case, which is much less than the 192 users per sector that may potentially be supported by cdma2000 for an equivalent bandwidth.

Moreover, in cells at the boundary of the system coverage (i.e., UMTS coverage) or at the edge of the coverage area of a given channel frequency, it is likely that many if not all terminals will be operated in compressed mode much if not all of the time. Since it is expected that the system coverage will be limited to dense urban areas even well after the initial deployment, this type of border cell will likely be very common.

Aspects of the invention provide techniques to time-share a common channelization code among multiple terminals for compressed mode transmissions. It is recognized that in many instances the compressed transmissions make up only a small fraction of a transmission gap pattern sequence. In these instances, allocation of a shorter-length channelization code to each terminal for the entire duration of the compressed mode operation would result in inefficient utilization of the channelization codes. Techniques are thus provided herein to time-share a common channelization code for the compressed mode transmissions for multiple terminals, which then make other channelization codes available for other uses.

For the transmission gap pattern sequence parameters described above, the longest transmission gap pattern can be defined by the following parameter values: TGL1=14 slots, TGL2=14, and TGPL1=TGPL2=144 frames. In this case, the transmission gap of 14 slots is spread over two compressed frames, and data is transmitted on 16 slots in these two compressed frames. The percentage of compressed mode transmission for the transmission gap pattern is thus 16/(144·15)= 1.4%, which is a small percentage. Conversely, the shortest transmission gap pattern can be defined by the following parameter values: TGL1=7 slots, TGL2=7, and TGPL1=TGPL2=2 frames. For this case, the percentage of compressed mode transmission for the transmission gap pattern is 8/15=53%. However, this case is not seen as realistic.

A more realistic scenario may be the measurement interval typically used in the GSM system, whereby a measurement is performed every 200 msec. A compressed mode configuration that can achieve this is: TGPL1=TGPL2=40 frames with TGL1=TGL2=14 slots and TGD=20 frames. In that case, the percentage of compressed transmission would be: 16/(20·15)= 5.3%. For this case, a terminal operated in compressed mode would be allocated an extra channelization code but only making use of it 5.3% of the time, which is highly inefficient.

In accordance with an aspect of the invention, a specific channelization code with a particular spreading factor can be reserved by the system and used for compressed mode transmissions. This common channelization code may be communicated to terminals operating in compressed mode (e.g., to perform inter-frequency/inter-RAT measurements) along with the transmission gap pattern sequence parameters. The sequences for the terminals can be carefully selected so that their compressed transmissions do not overlap. Whenever the system (i.e., the UTRAN) transmits data to a given terminal during its compressed frame, the common channelization code with a lower spreading factor is used instead of the normal channelization code.

Various schemes may be used to time-share a common channelization code among a number of terminals. These schemes may be designed to take into consideration various factors such as, for example, the type of compressed frames being transmitted (e.g., using a single-frame or a double-frame compressed mode pattern, which are described below), whether or not the frames for the terminals are time-aligned, the transmission gap lengths and other specifics of the compressed frames being transmitted, and so on. Some of the schemes are described below.

Figure 7A:
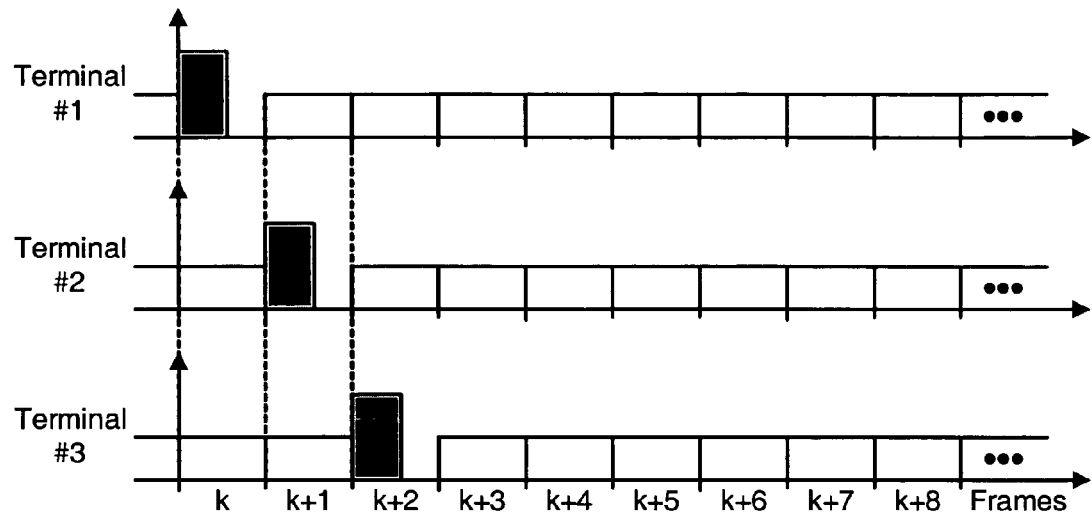
FIGS. 7A through 7E are diagrams illustrating various schemes for time-sharing a common channelization code among a number of terminals, in accordance with various embodiments of the invention.

FIG. 7A is a diagram illustrating a first scheme for time-sharing a common channelization code among a number of terminals, in accordance with an embodiment of the invention. Only three terminals are shown in FIG. 7A for simplicity, although the scheme may be extended to cover any number of terminals, depending on the transmission gap pattern sequence parameters for the terminals. For this scheme, the downlink transmissions to the terminals are time-aligned (i.e., the starts of the radio frames for all three terminals are aligned in time and further aligned to the base station's reference time). Moreover, a single-frame compressed mode pattern is used for the compressed frame transmissions, whereby the transmission gap resides completely within a single compressed frame.

For each compressed frame, the compressed transmission is shown as the shaded box and the transmission gap is shown located next to the shaded box and at the end of the compressed frame. However, the transmission gap may also be located at the start or the middle of the compressed frame. The transmit power for the compressed transmission is shown as being higher than that for the non-compressed frames to ensure equivalent (e.g., BER or PER) performance for all received radio frames. The single-frame compressed mode pattern is described in further detail in the 3GPP Document No. TS 25.212, section 4.4.2.

As shown in FIG. 7A, the compressed frames for the terminals are staggered such that only one compressed frame is transmitted to any terminal in any given frame. The common channelization code, $C_{ch,SF,x}$, can thus be time-shared such that it is used for the compressed frame for terminal 1 in frame k, for the compressed frame for terminal 2 in frame k+1, for the compressed frame for terminal 3 in frame k+2, and so on. Each terminal is also assigned a respective channelization code, $C_{ch,SF,m}$, to be used for its non-compressed frames.

The common channelization code is selected such that it is orthogonal to the channelization codes assigned to the terminals. For example, the common channelization code can be selected as a particular OVSF code with a lower spreading factor (e.g., $C_{ch,SF/2,x}$), and the channelization codes assigned to the terminals for their non-compressed frames may be selected from a set of OVSF codes generated from the remaining lower spreading factor OVSF codes (i.e., $C_{ch,SF,m}$, where m=0, 1, . . . SF-1 and m≠2x or 2x+1).

While in soft handover, a terminal concurrently receives data transmissions (i.e., radio frames) from multiple base stations. To ensure that the radio frames arrive at the terminal within a particular time window so that they can be properly processed and recovered, the W-CDMA standard provides a mechanism whereby the start time of the user-specific radio frames transmitted from each base station to the terminal can be adjusted. Typically, before a new base station is added to the terminal's active set, this base station's timing relative to that of a reference base station is determined by the terminal and reported to the system. The system can then instruct the new base station to adjust its transmit timing for the terminal such that the radio frames transmitted from this new base station are approximately aligned in time to the radio frames transmitted from the other active base stations, as observed at the terminal.

Each data transmission from a base station to a terminal may thus be associated with a particular "frame offset" that may take on any value depending on various factors. Since the base stations in the W-CDMA system may be operated asynchronously, the amount of frame offset to be applied at each base station for the radio frames transmitted to the terminal is dependent on (1) the difference in the timing of that base station to the timing of the terminal's reference base station and (2) the difference in the propagation delays from the two base stations to the terminal. Correspondingly, from each base station's perspective, the transmit timing for each terminal in communication with the base station may be associated with a respective frame offset (from the base station reference timing, which is used for the base station's common channels), and this frame offset may take on any value.

Orthogonality may be achieved for multiple signals received at a terminal if these signals are time-aligned and orthogonal channelization codes are used. Thus, to preserve orthogonality, the frame offsets are selected as integer multiples of the length of the channelization code.

Figure 7B:
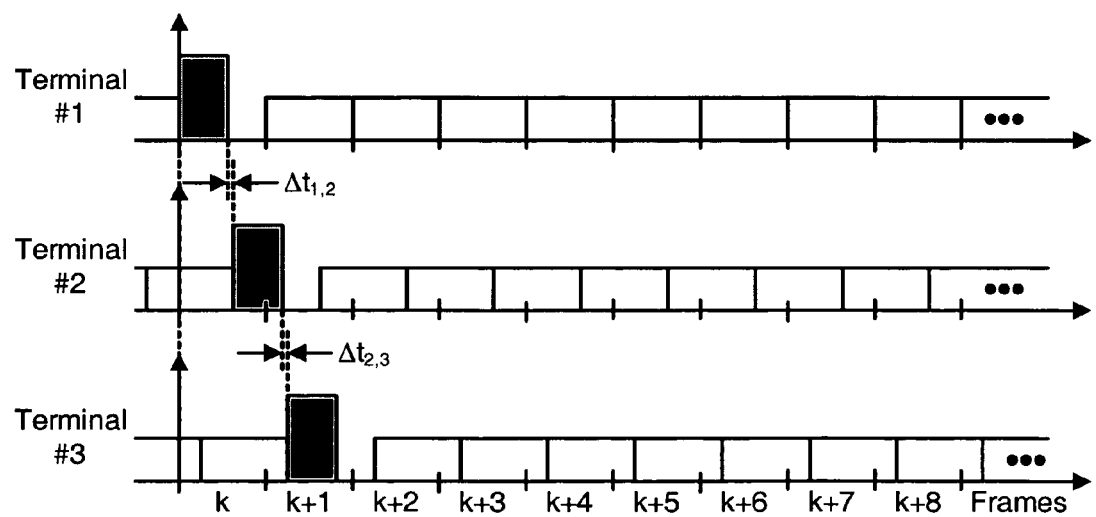

FIG. 7B is a diagram illustrating a second scheme for time-sharing a common channelization code among a number of terminals by overlapping the compressed frames. For this scheme, the downlink transmissions to the terminals may or may not be time-aligned, and the compressed transmissions for the terminals are scheduled as close in time as possible. The compressed frames may thus overlap, but not the compressed transmissions.

For each compressed frame, data is transmitted only during a fraction of the frame and no data is transmitted during the transmission gap that makes up the rest of the frame. Thus, the common channelization code is effectively used only during the fraction of the compressed frame where data is actually transmitted (i.e., the compressed transmission). In this case, improved utilization of the common channelization code may be realized by reusing the code as soon as it is no longer needed by the immediately prior compressed frame.

By scheduling the compressed transmissions as close in time as possible, more efficient utilization of the channelization code may be realized. The base station has knowledge (and may have some control over the assignment) of the frame offsets for all terminals and is further aware of the transmission gap pattern sequence parameters for each terminal operated in compressed mode. Based on the available information, the compressed frames for the terminals may be scheduled such that the compressed transmissions do not overlap while minimizing the time separation between these portions (to the extent possible).

Since the transmission gap pattern sequence parameters are determined by the system (e.g., a radio network controller (RNC) or a base station controller (BSC)) and provided to the terminals, the system can also select the proper parameter values such that the above stated goals of non-overlapping compressed transmissions and minimum time separation are achieved. The transmission gap can be adjusted by selecting the proper parameter values, which then correspondingly dictates the specific slots to be used for the compressed transmission.

Because of delay spread in the communication link, a transmitted signal may reach a terminal via a number of signal paths (i.e., multipaths). Moreover, a time difference may exist between the terminal's active base stations in soft handover due to different propagation delays to these base stations. To reduce possible the adverse effects due to the time difference and delay spread, the time separation $\Delta t_{X,Y}$ between the compressed transmissions for different terminals may be selected to be equal to or greater than the time difference and/or delay spread. This time separation is typically $1/10^{th}$ of a slot or less for CDMA systems and represents a "guard time" between the compressed transmissions for different terminals. If the frame offset is zero as shown in FIG. 7A, then a guard time of zero maximizes the reuse of the common channelization code.

Figure 7C:
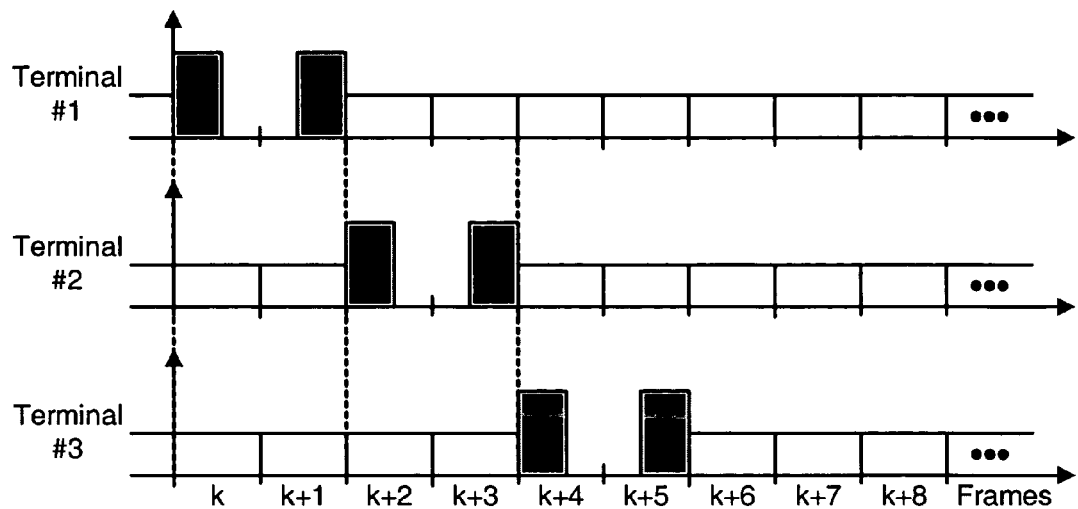

FIG. 7C is a diagram illustrating a third scheme for time-sharing a common channelization code among a number of terminals using a double-frame compressed mode pattern. For this scheme, the downlink transmissions to the terminals are time-aligned. In the double-frame compressed mode pattern, the transmission gap spans over two consecutive compressed frames and may be placed anywhere between these two frames as long as seven or less transmission gap slots are included in each frame. The double-frame compressed mode pattern may be used when the transmission gap is large (i.e., greater than eight slots wide). The double-frame compressed mode pattern is described in further detail in the aforementioned 3GPP Document No. TS 25.212, section 4.4.2.

As shown in FIG. 7C, the compressed frames for the terminals are staggered such that a pair of compressed frames is transmitted to each terminal in sequential order and only one compressed frame is transmitted to any terminal in any given frame. As shown in FIG. 7C, the common channelization code, $C_{ch,SF/2,x}$, can be shared such that it is used for the compressed frames for terminal 1 in frames k and k+1, for the compressed frames for terminal 2 in frames k+2 and k+3, for the compressed frames for terminal 3 in frame k+4 and k+5, and so on. Since the radio frames for the terminals are approximately time-aligned, the compressed frames for these terminals may be scheduled in any order.

Figure 7D:
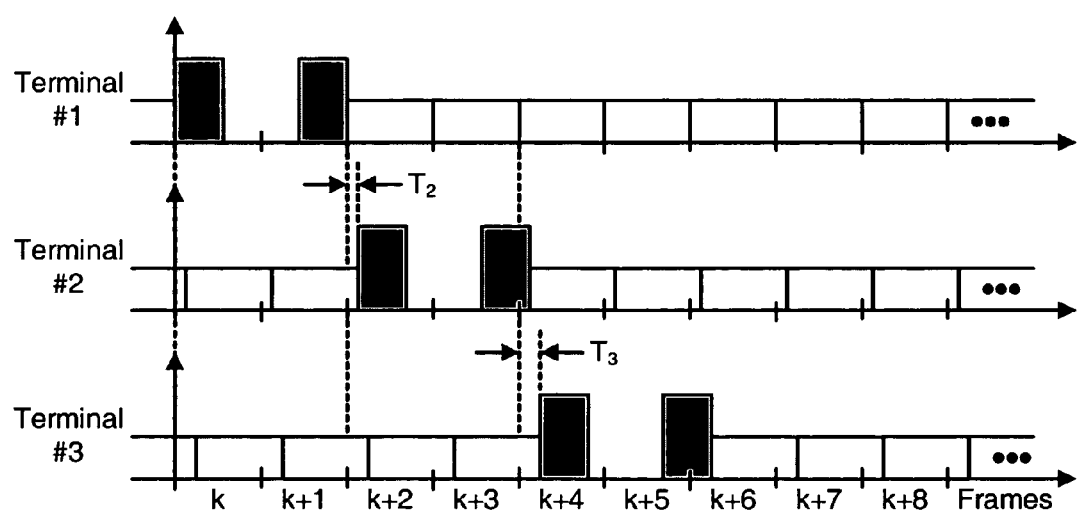

FIG. 7D is a diagram illustrating a fourth scheme for time-sharing a common channelization code among a number of terminals associated with different frame offsets and using the double-frame compressed mode pattern. For this scheme, the downlink transmissions to the terminals are not time-aligned and each terminal is associated with a respective frame offset that determines the start time of its radio frames. As shown in FIG. 7D, the start of the radio frames for terminal 1 is aligned to the timing of the base station (i.e., $T_1 \cong 0$) (as an example, for this diagram), the start of the radio frames for terminal 2 is offset by $T_2$ from the timing of the base station, and the start of the radio frames for terminal 3 is offset by $T_3$ from the timing of the base station.

In an embodiment, the compressed frames for the terminals are scheduled based in part on their associated frame offsets. Initially, the terminals are ordered based on the amount of their frame offsets and placed in a list. For the example shown in FIG. 7D, the ordering in the list would be terminal 1, terminal 2, terminal 3, and so on, since $T_1 \leq T_2 \leq T_3$. The compressed frames for the terminals are then scheduled based on the terminals' place in the ordered list. The common channelization code is then assigned to each scheduled terminal for its compressed frame. For this embodiment, if N terminals are operated in compressed mode, then N compressed frames may be transmitted for the N terminals in as little as N+1 frames, and only one additional frame is used to account for the different frame offsets for the terminals.

Figure 7E:
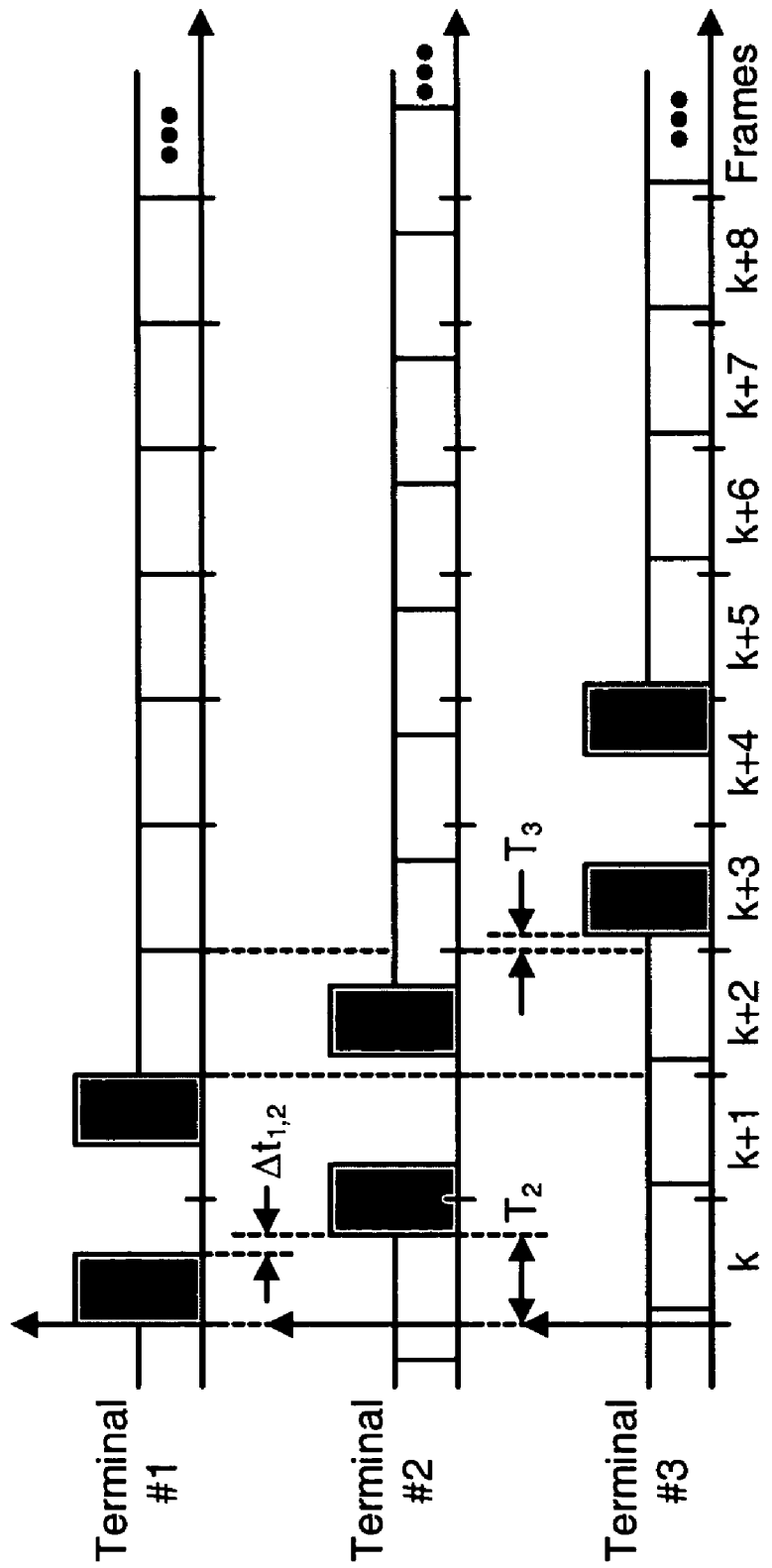

FIG. 7E is a diagram illustrating a fifth scheme for time-sharing a common channelization code among a number of terminals using interlaced compressed frame transmissions. For this scheme, the downlink transmissions to the terminals may or may not be time-aligned, and the double-frame compressed mode pattern is used for the compressed frames. As graphically illustrated in FIG. 7E, if the transmission gap for a compressed frame of a particular terminal is sufficiently large, then it may be possible to fit the compressed transmission of a compressed frame for another terminal within this transmission gap.

If the same transmission gap pattern sequence parameters are used for the terminals and the transmission gap is centered between the two compressed frames, then the compressed transmission of the compressed frame for one terminal may be fitted within the transmission gap of the compressed frame for another terminal if the length of the transmission gap (TGL) is greater than or equal to the length of the compressed transmission (which is 15-TGL/2). This condition can be expressed as:

TGL>15−TGL/2, which can be rearranged and expressed as:

TGL>10.

The inequality ">" is used above because it is generally difficult to exactly align the compressed transmissions.

As shown in FIG. 7E, by interlacing the compressed frames for two terminals, it may be possible to transmit the compressed frames for these terminals in three frames (e.g., k, k+1, and k+2) instead of four frames as shown in FIGS. 7D and 7E. This interlacing further improves the utilization of the common channelization code.

Figure 8:
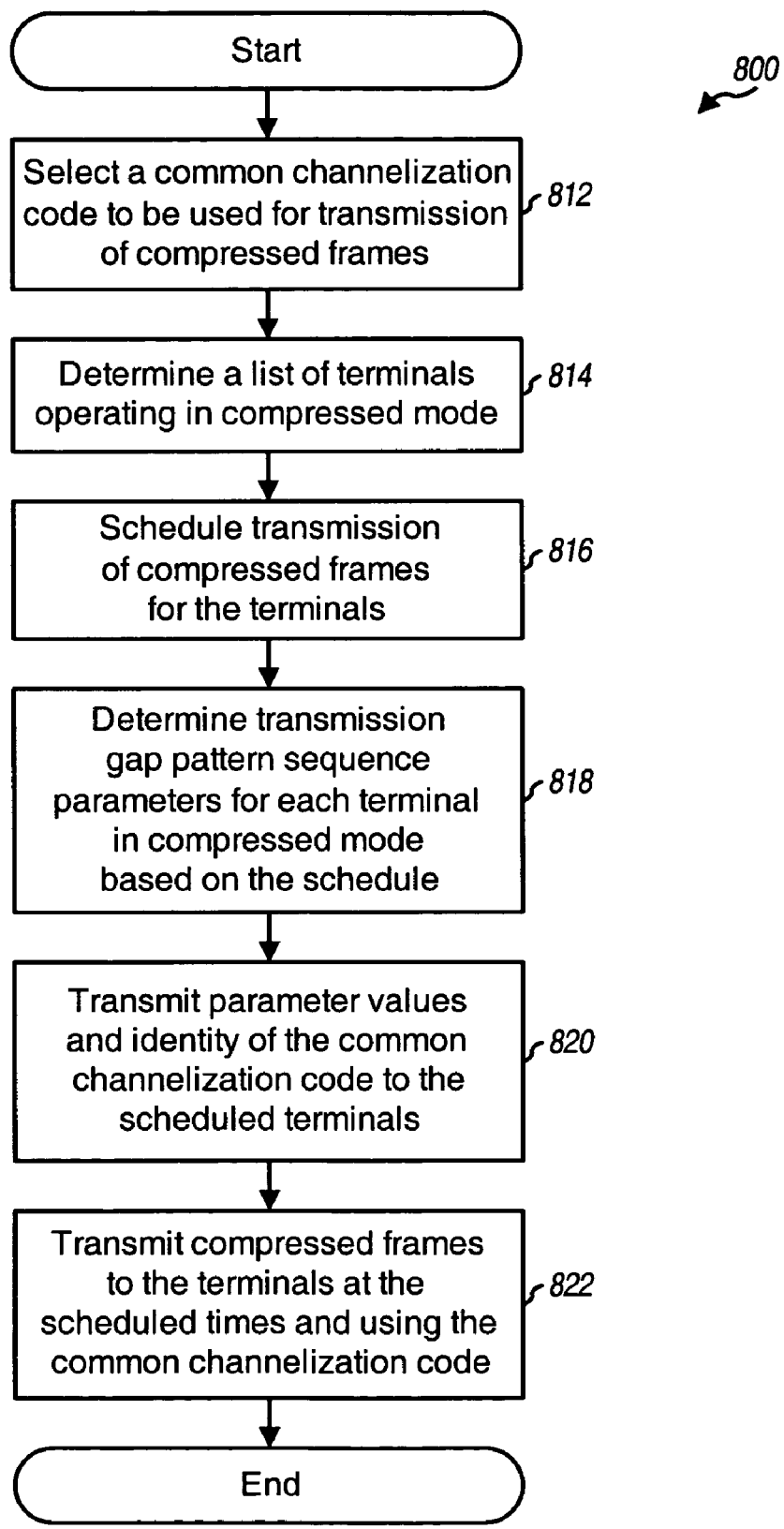
FIG. 8 is a flow diagram of a process to support compressed mode using time-sharing of the common channelization code.

FIG. 8 is a flow diagram of a process 800 to support compressed mode transmission using time-sharing of a common channelization code, in accordance with an embodiment of the invention. Process 800 may be implemented by each base station to support compressed mode for a number of terminals. Initially, a common channelization code to be used for the compressed frames for all terminals under consideration is selected and reserved, at step 812. This code may be selected as the first code in the code-space for the lower spreading factor (e.g., $C_{ch,SF/2,0}$). For normal operation, all terminals in communication with the base station are assigned respective channelization codes.

A list of terminals operating in compressed mode is then determined, at step 814. The compressed frames for the terminals are then scheduled based on any one of the schemes described above and further based on the requirements and capabilities of the terminal, at step 816. In scheduling the transmission of the compressed frames, the frame offsets for the terminals may be selected (if not constrained, for example, by soft handover requirements) to achieve efficient reuse of the common channelization code. If the radio frames for the terminals are not time-aligned, then the terminals may be ordered based on the value of their frame offsets and the scheduling of the compressed frames may take into account the order of the terminals in the list, as described above. The scheduling may also be performed to overlap the compressed frames, as shown in FIG. 7B, or to interlace the compressed frames, as shown in FIG. 7E. For each terminal in compressed mode, the transmission gap pattern sequence parameters are then determined based on the schedule, at step 818.

Prior to the transmission of the compressed frames to the terminals, the transmission gap pattern sequence parameter values and the identity of the common channelization code to be used for the compressed frames are transmitted to the terminals, at step 820. Upon receiving this information, each terminal in compressed mode is able to properly process and recover its compressed frames using the timing information in the parameter values and the identified common channelization code. The base station thereafter transmits the compressed frames to the terminals at the scheduled times (or frames) and using the common channelization code, at step 822.

The improvement in the utilization of the channelization codes using the time-sharing techniques described herein may be quantified by way of an example. In this example, a number of voice users are supported and assigned channelization codes with SF=128. This operating scenario is one in which the use of compressed mode with SF/2 is crucial. In this example, a particular channelization code with SF=64 (e.g., $C_{ch64,0}$ or $C_{ch}(64,0)$) is reserved as the common channelization code to be used for the compressed mode. For this example, the transmission gap pattern sequence parameters are selected as: TGPL1=TGPL2=400 msec=40 frames and TGL1=TGL2=14 slots. In this example, ten terminals need to perform inter-frequency/inter-RAT measurements.

For a conventional implementation of the compressed mode, ten channelization codes with SF=128 are assigned to the ten terminals for their non-compressed frames for normal operation. And for the compressed mode, ten channelization codes with SF=64 are also assigned to the ten terminals. However, since the SF=64 code for each terminal is defined by the W-CDMA standard to be related to the SF=128 code assigned to the terminal (i.e., the SF=128 code is generated from, and overlaps with, the SF=64 code), each terminal is thus effectively assigned two SF=64 codes. Thus, 20 codes with SF=128 are used for the ten terminals for both compressed and normal modes.

The time-sharing techniques described herein can reduce the number of required channelization codes. The amount of improvement in code utilization is dependent on various factors such as the particular scheme to be used for the compressed mode. The improvement for some of the schemes is described below.

For the third scheme shown in FIG. 7C, the radio frames for the terminals are time-aligned (i.e., frame offset is zero for all terminals), and the (double) compressed frames for a different terminal may be scheduled every two frames. The ten terminals can time-share a common channelization code for the compressed mode. This common channelization code is selected as a channelization code with SF=64 that is orthogonal to the ten SF=128 codes assigned to the ten terminals for normal operation. The code usage for this example and this scheme is thus 12 codes with SF=128 (i.e., ten codes with SF=128 for the normal mode plus two codes with SF=128 for the common channelization code with SF=64). The time-sharing technique can thus reduce the code requirement by 40% (i.e., (20−12)/20=0.40) compared to the conventional implementation described above. Equivalently, more terminals may be served using the time-sharing techniques described herein.

For the fourth scheme shown in FIG. 7D, the radio frames for the terminals are not time-aligned and the compressed frames for the ten terminals can be scheduled based on their frame offsets relative to the base station reference timing. If the compressed frames for the ten terminals are scheduled in order, starting with the terminal with the smallest frame offset and ending with the terminal with the largest frame offset, then for the parameter values described above, it is possible to schedule nine terminals to share a common channelization code. In this case, 18 compressed frames for the nine terminals may be scheduled in 20 frames and two frames are lost due to the non-aligned radio frames. The code usage will be 11 codes with SF=128 (i.e., 9 codes with SF=128 for the nine terminals for normal mode plus two codes with SF=128 for the common channelization code with SF=64) instead of 18 codes with SF=128 for the conventional implementation. This represents a reduction in code requirement of 38% (i.e., (18−11)/18=0.38).

For the fourth and fifth schemes described above, the improvement in code utilization described above may be achieved independently of the length of the transmission gap.

For the fifth scheme shown in FIG. 7E, the compressed transmissions for the terminals can be interlaced if the transmission gap is such that TGL>10 (TGL=14 slots in the above example). In that case, it may be possible to interlace the compressed frames, and the four compressed frames for each pair of terminals may be transmitted in three frames instead of four, as shown in FIG. 7E. For the parameter values described above, it may be possible to time-share the common channelization code among at least 14 terminals. The code usage for the 14 terminals would then be 16 codes with SF=128 (i.e., 14 codes with SF=128 for normal mode and two codes with SF=128 for the common code) instead of 28 codes with SF=128 that would be needed for the conventional implementation. This then provides a reduction in code usage of 42% (i.e., (28−16)/28).

The downlink code-space is seen as a potentially significant limitation to the system capacity in W-CDMA. As noted above, in cells at the boundary of the system coverage or at the edge of the coverage area of a given channel frequency, it is likely that many or all terminals will be in compressed mode all or much of the time. The conventional implementation for supporting compressed mode with SF/2 further exacerbates this limitation since another channelization code is effectively used for each terminal in compressed mode. The techniques described herein can provide significant reduction in code-space usage and may be implemented with little impact on current design.

For clarity, various aspects and embodiments of the time-sharing of a common channelization code among a number of terminals are described for a specific application in W-CDMA (i.e., the transmission of compressed frames). The techniques described herein may also be used for other types of data transmissions. In general, if the radio frames to be transmitted to the terminals may be scheduled to be non-overlapping, then a common channelization code may be used in a time-shared manner to process (e.g., channelize) the radio frames for the terminals. The techniques described herein may also be used for other types of codes (e.g., scrambling codes) used to process data prior to transmission.

Referring back to FIGS. 2 and 3, the elements of terminal 106 and base station 104 may be designed to implement various aspects and embodiments of the invention, as described above. The elements of the terminal or base station may be implemented with a digital signal processor (DSP), an application specific integrated circuit (ASIC), a processor, a microprocessor, a controller, a microcontroller, a field programmable gate array (FPGA), a programmable logic device, other electronic units, or any combination thereof. Some of the functions and processing described herein may also be implemented with software executed on a processor. For example, selection of a particular channelization code to use as the common channelization code, the scheduling of the compressed frames for the terminals operating in compressed mode, and so on, may be performed by controller 230.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for transmitting data to a plurality of terminals in a wireless communication system, comprising:

means for assigning each of the plurality of terminals a respective channelization code used to channelize data transmitted in non-compressed frames for the terminal, wherein the data for each non-compressed frame is transmitted within a defined time period;

means for selecting a common channelization code used to channelize data transmitted in compressed frames for the plurality of terminals, wherein the data for each compressed frame is transmitted within a shortened time period compared to the defined time period for a non-compressed frame;

means for scheduling transmission of compressed frames for the plurality of terminals such that compressed transmissions are non-overlapping;

means for channelizing non-compressed frames for each terminal with the channelization code assigned to the terminal; and means for channelizing compressed frames for the plurality of terminals with the common channelization code, wherein the common channelization code has a length that is half of the length of the shortest channelization code assigned to the plurality of terminals.

2. The apparatus of claim 1, further comprising:
means for scrambling the compressed and non-compressed frames for the plurality of terminals with a particular scrambling code.

3. The apparatus of claim 1, wherein the common channelization code is orthogonal to the channelization codes assigned to the plurality of terminals.

4. The apparatus of claim 1, wherein the channelization codes comprise orthogonal variable spreading factor (OVSF) codes defined by W-CDMA standard.

5. The apparatus of claim 1, wherein the compressed frames for the plurality of terminals are scheduled to be non-overlapping.

6. The apparatus of claim 1, wherein each compressed frame includes one or more compressed transmissions and a transmission gap, and wherein the compressed frames for the plurality of terminals are scheduled such that the compressed transmissions are non-overlapping.

7. The apparatus of claim 6, wherein a compressed transmission of a compressed frame for a first terminal overlaps at least a portion of a transmission gap of a compressed frame for a second terminal.

8. The apparatus of claim 1, wherein each compressed frame includes one or more compressed transmissions and a transmission gap, and wherein the compressed frames for the plurality of terminals are scheduled to be interlaced such that a compressed transmission and a transmission gap for a first compressed frame for a first terminal respectively overlaps a transmission gap and a compressed transmission for a second compressed frame for a second terminal.

9. The apparatus of claim 1, further comprising:
for each terminal, means for determining a frame offset indicative of a time difference between the start of the compressed frames for the terminal and a reference time, wherein the compressed frames for the plurality of terminals are scheduled based in part on the determined frame offsets for the terminals.

10. The apparatus of claim 9, further comprising:
means for ranking the frame offsets for the plurality of terminals, wherein the compressed frames for the plurality of terminals are scheduled based on the ranking of the frame offsets such that compressed frames for terminals having shorter frame offsets are scheduled for transmission prior to compressed frames for terminals having longer frame offsets.

11. The apparatus of claim 1, wherein the non-compressed frames for each terminal is transmitted on a code channel dedicated to the terminal and identified by the channelization code assigned to the terminal.

12. The apparatus of claim 1, wherein the compressed frames for the plurality of terminals are transmitted on a code channel common to the terminals and identified by the common channelization code.

13. The apparatus of claim 1, further comprising:
for each terminal, means for selecting values for a set of parameters used to define the timing of the transmission of the compressed frames to the terminal.

14. The apparatus of claim 13, further comprising:
for each terminal, means for transmitting the parameter values to the terminal prior to transmission of the compressed frames to the terminal.

15. The apparatus of claim 1, further comprising:
means for transmitting identity of the common channelization code to the plurality of terminals prior to transmission of the compressed frames to the terminals.

16. The apparatus of claim 1, wherein the compressed frames are generated using a single-frame compressed mode pattern whereby a transmission gap is included entirely within each compressed frame.

17. The apparatus of claim 1, wherein the compressed frames are generated using a double-frame compressed mode pattern whereby a transmission gap spans over a pair of compressed frames.

18. The apparatus of claim 1, wherein the communication system is a CDMA communication system.

19. The apparatus of claim 18, wherein the CDMA communication system implements W-CDMA standard.

20. An apparatus for transmitting data to a plurality of terminals in a W-CDMA communication system, comprising:
means for assigning each of the plurality of terminals a respective channelization code used to channelize data transmitted in non-compressed frames for the terminal, wherein the data for each non-compressed frame is transmitted within a frame of a defined time duration;
means for selecting a common channelization code used to channelize data transmitted in compressed frames for the plurality of terminals, wherein each compressed frame includes one or more compressed transmissions and a transmission gap, and wherein the common channelization code is orthogonal to the channelization codes assigned to the plurality of terminals and has a length that is half of the length of a shortest channelization code assigned to the terminals;
means for scheduling transmission of compressed frames for the plurality of terminals such that the compressed transmissions for the compressed frames are non-overlapping;
means for channelizing non-compressed frames for each terminal with the channelization code assigned to the terminal; and
means for channelizing compressed frames for the plurality of terminals with the common channelization code.

21. An apparatus for transmitting data to a plurality of terminals in a wireless communication system, comprising:
means for assigning each of the plurality of terminals a respective channelization code used for a first type of data transmission to the terminal;
means for selecting a common channelization code used for a second type of data transmission to the plurality of terminals;
means for scheduling the second type of data transmission for the plurality of terminals such that data transmitted for the second type is non-overlapping;
means for channelizing the first type of data transmission for each terminal with the channelization code assigned to the terminal; and
means for channelizing the second type of data transmission for the plurality of terminals with the common channelization code.

22. The apparatus of claim 21, wherein the first type of data transmission comprises non-compressed frames, and wherein the data for each non-compressed frame is transmitted within a defined time period.

23. The apparatus of claim 22, wherein the second type of data transmission comprises compressed frames, and wherein the data for each compressed frame is transmitted within a shortened time period compared to the defined time period for a non-compressed frame.

24. The apparatus of claim 21, wherein the channelization codes comprise orthogonal variable spreading factor (OVSF) codes defined by W-CDMA standard.

25. The apparatus of claim 21, wherein the common channelization code has a length that is half of the length of a shortest channelization code assigned to the plurality of terminals.

26. A method for transmitting data to a plurality of terminals in a wireless communication system, comprising:
assigning each of the plurality of terminals a respective channelization code used to channelize data transmitted in non-compressed frames for the terminal, wherein the data for each non-compressed frame is transmitted within a defined time period;
selecting a common channelization code used to channelize data transmitted in compressed frames for the plurality of terminals, wherein the data for each compressed frame is transmitted within a shortened time period compared to the defined time period for a non-compressed frame;
scheduling transmission of compressed frames for the plurality of terminals such that compressed transmissions are non-overlapping;
channelizing non-compressed frames for each terminal with the channelization code assigned to the terminal; and
channelizing compressed frames for the plurality of terminals with the common channelization code.

27. The method of claim 26, further comprising:
scrambling the compressed and non-compressed frames for the plurality of terminals with a particular scrambling code.

28. The method of claim 26, wherein the common channelization code is orthogonal to the channelization codes assigned to the plurality of terminals.

29. The method of claim 26, wherein the channelization codes comprise orthogonal variable spreading factor (OVSF) codes defined by W-CDMA standard.

30. The method of claim 26, wherein the compressed frames for the plurality of terminals are scheduled to be non-overlapping.

31. The method of claim 26, wherein each compressed frame includes one or more compressed transmissions and a transmission gap, and wherein the compressed frames for the plurality of terminals are scheduled such that the compressed transmissions are non-overlapping.

32. The method of claim 31, wherein a compressed transmission of a compressed frame for a first terminal overlaps at least a portion of a transmission gap of a compressed frame for a second terminal.

33. The method of claim 26, wherein each compressed frame includes one or more compressed transmissions and a transmission gap, and wherein the compressed frames for the plurality of terminals are scheduled to be interlaced such that a compressed transmission and a transmission gap for a first compressed frame for a first terminal respectively overlaps a transmission gap and a compressed transmission for a second compressed frame for a second terminal.

34. The method of claim 26, further comprising:
for each terminal, determining a frame offset indicative of a time difference between the start of the compressed frames for the terminal and a reference time, wherein the compressed frames for the plurality of terminals are scheduled based in part on the determined frame offsets for the terminals.

35. The method of claim 34, further comprising:
ranking the frame offsets for the plurality of terminals, wherein the compressed frames for the plurality of terminals are scheduled based on the ranking of the frame offsets such that compressed frames for terminals having shorter frame offsets are scheduled for transmission prior to compressed frames for terminals having longer frame offsets.

36. The method of claim 26, wherein the non-compressed frames for each terminal is transmitted on a code channel dedicated to the terminal and identified by the channelization code assigned to the terminal.

37. The method of claim 26, wherein the compressed frames for the plurality of terminals are transmitted on a code channel common to the terminals and identified by the common channelization code.

38. The method of claim 26, further comprising:
for each terminal, selecting values for a set of parameters used to define the timing of the transmission of the compressed frames to the terminal.

39. The method of claim 38, further comprising:
for each terminal, transmitting the parameter values to the terminal prior to transmission of the compressed frames to the terminal.

40. The method of claim 26, further comprising:
transmitting identity of the common channelization code to the plurality of terminals prior to transmission of the compressed frames to the terminals.

41. The method of claim 26, wherein the compressed frames are generated using a single-frame compressed mode pattern whereby a transmission gap is included entirely within each compressed frame.

42. The method of claim 26, wherein the compressed frames are generated using a double-frame compressed mode pattern whereby a transmission gap spans over a pair of compressed frames.

43. The method of claim 26, wherein the communication system is a CDMA communication system.

44. The method of claim 43, wherein the CDMA communication system implements W-CDMA standard.

45. A base station for transmitting data to a plurality of terminals in a wireless communication system, comprising:
a controller operative to:
assign each of the plurality of terminals a respective channelization code used for a first type of data transmission to the terminal;
select a common channelization code used for a second type of data transmission to the plurality of terminals;
schedule the second type of data transmission for the plurality of terminals such that data transmitted for the second type is non-overlapping;
channelize the first type of data transmission for each terminal with the channelization code assigned to the terminal; and
channelize the second type of data transmission for the plurality of terminals with the common channelization code.

46. The base station of claim 45, wherein the first type of data transmission comprises non-compressed frames, and wherein the data for each non-compressed frame is transmitted within a defined time period.

47. The base station of claim 46, wherein the second type of data transmission comprises compressed frames, and wherein the data for each compressed frame is transmitted within a shortened time period compared to the defined time period for a non-compressed frame.

48. The base station of claim 45, wherein the channelization codes comprise orthogonal variable spreading factor (OVSF) codes defined by W-CDMA standard.

49. The base station of claim 45, wherein the common channelization code has a length that is half of the length of a shortest channelization code assigned to the plurality of terminals.

* * * * *

UNITED STATES PATENT AND TRADEMARK OFFICE
CERTIFICATE OF CORRECTION

PATENT NO. : 7,599,336 B2
APPLICATION NO. : 10/929120
DATED : October 6, 2009
INVENTOR(S) : Vayanos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Twenty-eighth Day of September, 2010

David J. Kappos
*Director of the United States Patent and Trademark Office*